United States Patent
Fujiwara et al.

(10) Patent No.: US 12,529,605 B2
(45) Date of Patent: Jan. 20, 2026

(54) PYROELECTRIC INFRARED SENSOR AND ELECTRONIC DEVICE COMPRISING PYROELECTRIC INFRARED SENSOR

(71) Applicant: TOKIN CORPORATION, Shiroishi (JP)

(72) Inventors: Shigemi Fujiwara, Sendai (JP); Makoto Kaneko, Sendai (JP)

(73) Assignee: TOKIN CORPORATION, Miyagi (JP)

( * ) Notice: Subject to any disclaimer, the term of this patent is extended or adjusted under 35 U.S.C. 154(b) by 219 days.

(21) Appl. No.: 18/220,299

(22) Filed: Jul. 11, 2023

(65) Prior Publication Data

US 2024/0272006 A1    Aug. 15, 2024

(30) Foreign Application Priority Data

Feb. 14, 2023   (JP) .................. 2023-021130

(51) Int. Cl.
*G01J 5/34* (2022.01)
*G01J 5/02* (2022.01)

(52) U.S. Cl.
CPC .............. *G01J 5/34* (2013.01); *G01J 5/0205* (2013.01)

(58) Field of Classification Search
CPC .................. G01J 5/34; G01J 5/0205
See application file for complete search history.

(56) References Cited

U.S. PATENT DOCUMENTS

2015/0292949 A1   10/2015 Noda et al.

FOREIGN PATENT DOCUMENTS

| CN | 214309140 U | * | 9/2021 | |
|---|---|---|---|---|
| EP | 2947432 A1 | * | 11/2015 | ............ G01J 1/0271 |
| JP | 2000077833 A | * | 3/2000 | |
| JP | 2012020909 A | | 2/2012 | |
| JP | 2012122908 A | | 6/2012 | |
| JP | 2013035704 A | | 2/2013 | |

OTHER PUBLICATIONS

Extended European Search Report (EESR) dated Jun. 19, 2024, issued in counterpart European Application No. 23188237.4.
European Office Action dated Mar. 20, 2025, issued in counterpart European Application No. 23188237.4.

* cited by examiner

*Primary Examiner* — David J Makiya
*Assistant Examiner* — Fani Polyzos Boosalis
(74) *Attorney, Agent, or Firm* — Holtz, Holtz & Volek PC (57) ABSTRACT

A pyroelectric infrared sensor comprises an internal board, a pyroelectric element and a capacitor element. The internal board is provided with a first electrode pad and a second electrode pad. The pyroelectric element has a composition of PbCa(MnSb)TiO and is connected to the first electrode pad. The capacitor element is connected to the second electrode pad with a high melting point solder paste which has a liquidus temperature equal to or more than 240° C.

12 Claims, 4 Drawing Sheets

PYROELECTRIC INFRARED SENSOR AND ELECTRONIC DEVICE COMPRISING PYROELECTRIC INFRARED SENSOR

CROSS REFERENCE TO RELATED APPLICATIONS

This application is based on and claims priority under 35 U.S.C. § 119 to Japanese Patent Application No. JP 2023-021130 filed Feb. 14, 2023, the content of which is incorporated herein in its entirety by reference.

BACKGROUND OF THE INVENTION

This invention relates to a pyroelectric infrared sensor comprising a pyroelectric element which has a high Curie temperature.

This type of pyroelectric infrared sensor is disclosed in JP 2013-35704 A (Patent Document 1), the content of which is incorporated herein by reference. The pyroelectric element of Patent Document 1 has a composition of PbCa(MnSb)TiO considering that the pyroelectric element will be exposed to a high temperature of 220° C. or more in a reflow oven.

The pyroelectric infrared sensor of Patent Document 1 is configured to be mounted on a main board or an external board together with electronic and electrical components other than the pyroelectric infrared sensor. The thus-mounted various components are reflowed and form an electronic device. There is concern that the thus-manufactured electronic device might have problems even though the reflow is performed under an expected temperature of 220° C.

SUMMARY OF THE INVENTION

It is therefore an object of the present invention to provide a pyroelectric infrared sensor which can reduce problems due to reflow on the basis of supposition that the concerned problems might be caused by the pyroelectric infrared sensor. It is also an object of the present invention to provide an electronic device comprising this pyroelectric infrared sensor.

As a result of studies of the inventors of the present invention, the inventors have noticed the following possible reasons why a pyroelectric infrared sensor might cause problems on an electronic device.

A solder paste having liquidus temperature about 220° C. is usually used when a pyroelectric infrared sensor and other components are connected to a main board. Therefore, the temperature during a reflow process is set to be about 220° C. which matches the liquidus temperature of the solder paste.

However, the thus-manufactured electronic device sometimes comprises a main board on which not only an electronic component having a size similar to that of a pyroelectric infrared sensor but also another electronic component having a size rather larger than the pyroelectric infrared sensor is mounted. Regarding such an electronic device, even when the preset temperature during a reflow process is about 220° C., the heating time is sometimes made longer than expected so that the large electronic component can be reliably soldered on the main board. As a result of this long time heating, the peak temperature in a reflow oven might reach up to near 250° C. As described above, the peak temperature in a reflow process sometimes exceeds the expected temperature.

The pyroelectric element of the pyroelectric infrared sensor of Patent Document 1 has a Curie temperature higher than the peak temperature about 250° C. Therefore, the pyroelectric element itself does not cause any problems. However, the pyroelectric infrared sensor includes components other than the pyroelectric element which might cause problems.

In an existing pyroelectric infrared sensor, components other than a pyroelectric element are usually connected to an internal board with a solder paste similar to a solder paste which is used to connect the existing pyroelectric infrared sensor to a main board. In other words, the solder past having liquidus temperature about 220° C. is also used in a pyroelectric infrared sensor. When the peak temperature exceeds the expected temperature during a reflow process in which a pyroelectric infrared sensor is connected to a main board, the solder past in the pyroelectric infrared sensor might be remelted, and the thus-remelted solder past might cause electrical malfunction. As described above, the unintentionally remelted solder past might cause problems. The present invention is made on the basis of the consideration described above and specifically provides a pyroelectric infrared sensor having a structure described below.

An aspect of the present invention provides a pyroelectric infrared sensor comprising an internal board, a pyroelectric element and a capacitor element. The internal board is provided with a first electrode pad and a second electrode pad. The pyroelectric element has a composition of PbCa(MnSb)TiO and is connected to the first electrode pad. The capacitor element is connected to the second electrode pad with a high melting point solder paste which has a liquidus temperature equal to or more than 240° C.

Another aspect of the present invention provides an electronic device comprising the pyroelectric infrared sensor and an external board. The pyroelectric infrared sensor is connected to the external board with a low melting point solder paste which has a melting point lower than that of the high melting point solder paste.

According to an aspect of the present invention, while the pyroelectric infrared sensor is expected to be connected to a main board or an external board of an electronic device with a low melting point solder paste, the capacitor element of the pyroelectric infrared sensor is connected to the electrode pad of the internal board with the high melting point solder paste. Accordingly, even when the peak temperature during a reflow process in the manufacture of the electronic device is made high, problems due to reflow can be reduced.

An appreciation of the objectives of the present invention and a more complete understanding of its structure may be had by studying the following description of the preferred embodiment and by referring to the accompanying drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
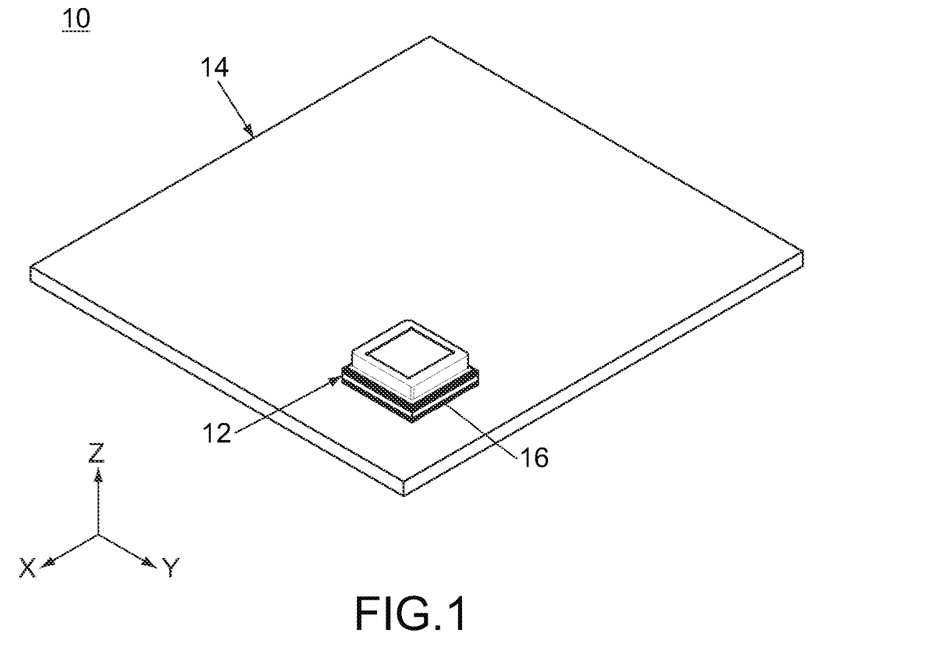
FIG. 1 is a perspective view showing an electronic device according to an embodiment of the present invention.

Referring to FIG. 1, an electronic device 10 according to an embodiment of the present invention comprises a pyroelectric infrared sensor 12 and an external board 14. The pyroelectric infrared sensor 12 is a sensor which uses pyroelectric effect to detect infrared light. The electronic device 10 comprises non-illustrated various electronic and electric components (hereafter, collectively referred to merely as "component" or "components") in addition to the aforementioned illustrated members. The pyroelectric infrared sensor 12 is mounted on the external board 14 together with the other components and is electrically connected with the other components through an electronic circuit (not shown).

For example, the pyroelectric infrared sensor 12 generates a voltage in accordance with change of the detected infrared light and outputs the generated voltage to the electronic circuit (not shown) of the electronic device 10. For example, the electronic device 10 determines that a human being enters into a room based on the voltage output by the pyroelectric infrared sensor 12 and performs various actions. These variously actions include turning on a light, reporting the entrance, etc. The electronic device 10 of the present embodiment has the aforementioned structure and function. However, the structure and the function of the electronic device 10 according to the present invention are not specifically limited, provided that the pyroelectric infrared sensor 12 is incorporated in the electronic device 10. For example, the electronic device 10 may further comprise a case (not shown) which accommodates the external board 14.

Figure 2:
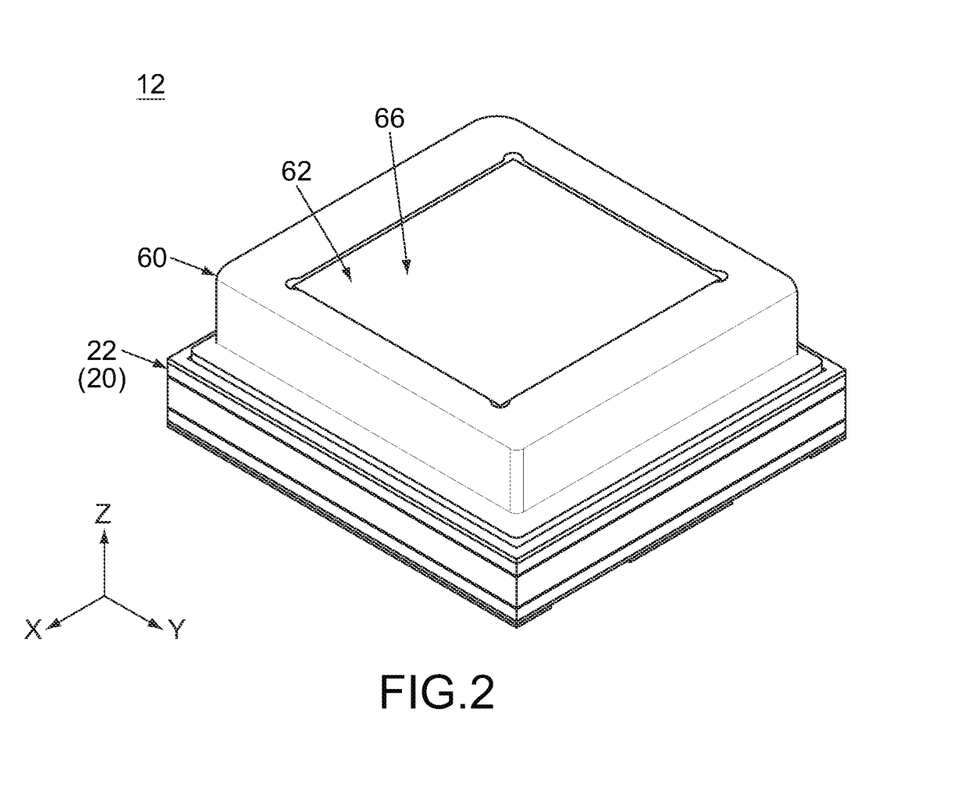
FIG. 2 is a perspective view showing a pyroelectric infrared sensor incorporated in the electronic device of FIG. 1.

Referring to FIG. 2, the pyroelectric infrared sensor 12 of the present embodiment comprises a main member 20, a shield case 60 made of metal and an optical filter 66. The shield case 60 and the optical filter 66 are members for radiating infrared light onto a predetermined part of the main member 20. The main member 20 is a member for detecting the irradiated infrared light. The pyroelectric infrared sensor 12 of the present embodiment comprises only the main member 20, the shield case 60 and the optical filter 66. However, the present invention is not limited thereto. For example, the pyroelectric infrared sensor 12 may further comprise another member in addition to the main member 20, the shield case 60 and the optical filter 66.

The main member 20 of the present embodiment has a rectangular flat-plate shape. In detail, the main member 20 has a rectangular shape in a horizontal plane. The shield case 60 is attached to the main member 20 from above in an upper-lower direction. The upper-lower direction of the present embodiment is the Z-direction. In the present embodiment, "upward" means the positive Z-direction, and "downward" means the negative Z-direction. The horizontal plane of the present embodiment is a plane perpendicular to the upper-lower direction and the XY-plane defined by a first horizontal direction (X-direction) and a second horizontal direction (Y-direction). The aforementioned directions and planes do not indicate the absolute positional relation relative to the ground but indicates a positional relation relative to a bottom surface of the main member 20.

The shield case 60 protrudes upward from the main member 20. The shield case 60 is formed with an opening 62. The opening 62 is located at the middle of the shield case 60 in the horizontal plane. The opening 62 has a rectangular shape in the horizontal plane and passes through the shield case 60 in the upper-lower direction.

The optical filter 66 has a thin rectangular flat-plate shape in parallel to the horizontal plane. The optical filter 66 is made of material such as silicon and allows infrared light to pass therethrough. In particular, the optical filter 66 of the present embodiment selectively allows infrared light of a predetermined frequency to pass therethrough. The optical filter 66 is attached to the opening 62. In detail, an edge of the optical filter 66 in the horizontal plane is adhered and fixed to an inner surface of the shield case 60 with a conductive adhesive (not shown) via an outer sealing member (not shown). The thus-fixed optical filter 66 seamlessly covers the whole opening 62 from below.

Each of the main member 20, the shield case 60 and the optical filter 66 of the present embodiment has the aforementioned structure. However, the present invention is not limited thereto, but the structure of each of the main member 20, the shield case 60 and the optical filter 66 can be modified as necessary. For example, each of the main member 20, the shield case 60 and the optical filter 66 may have a circular shape in the horizontal plane.

Figure 4:
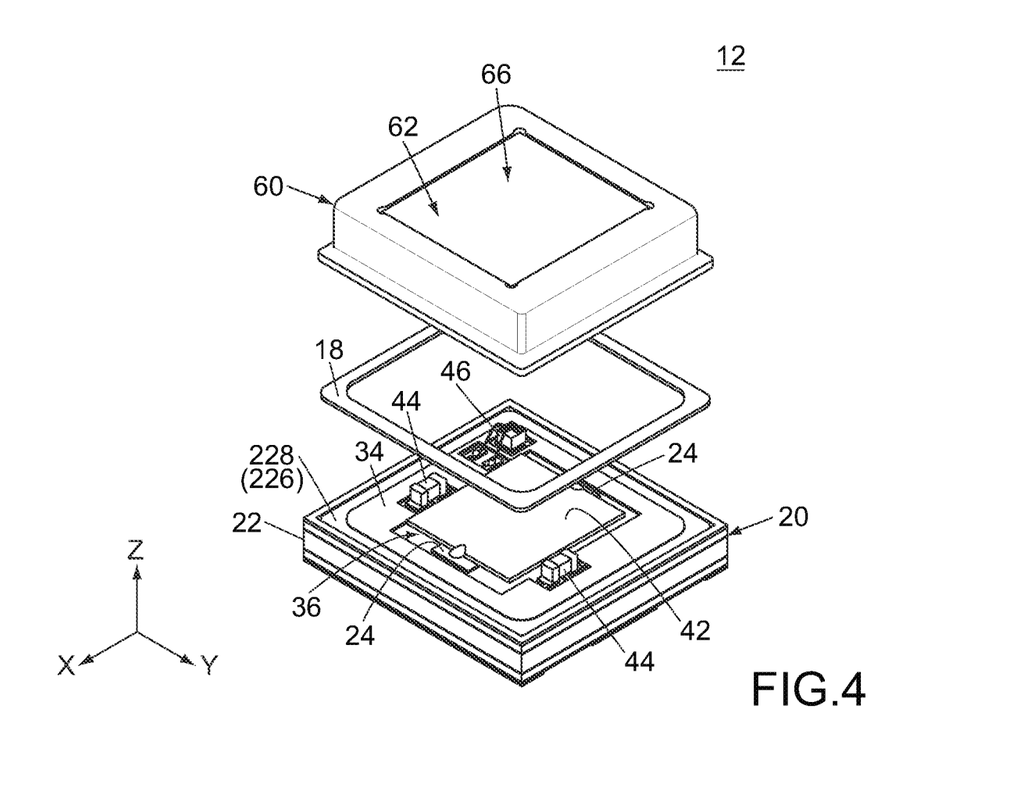
FIG. 4 is an exploded, perspective view showing the pyroelectric infrared sensor of FIG. 2.

As shown in FIG. 4, the main member 20 of the present embodiment comprises an internal board 22, a pyroelectric element 42, two capacitor elements 44 and a junction field effect transistor (JFET) 46. Thus, the pyroelectric infrared sensor 12 of the present embodiment comprises the internal board 22, the pyroelectric element 42, the capacitor elements 44 and the JFET 46. However, the present invention is not limited thereto. For example, the number of the capacitor elements 44 can be modified as necessary. Moreover, the main member 20 may further comprise another member in addition to the aforementioned members.

Hereafter, explanation will be made about each member of the main member 20 of the present embodiment.

Figure 5:
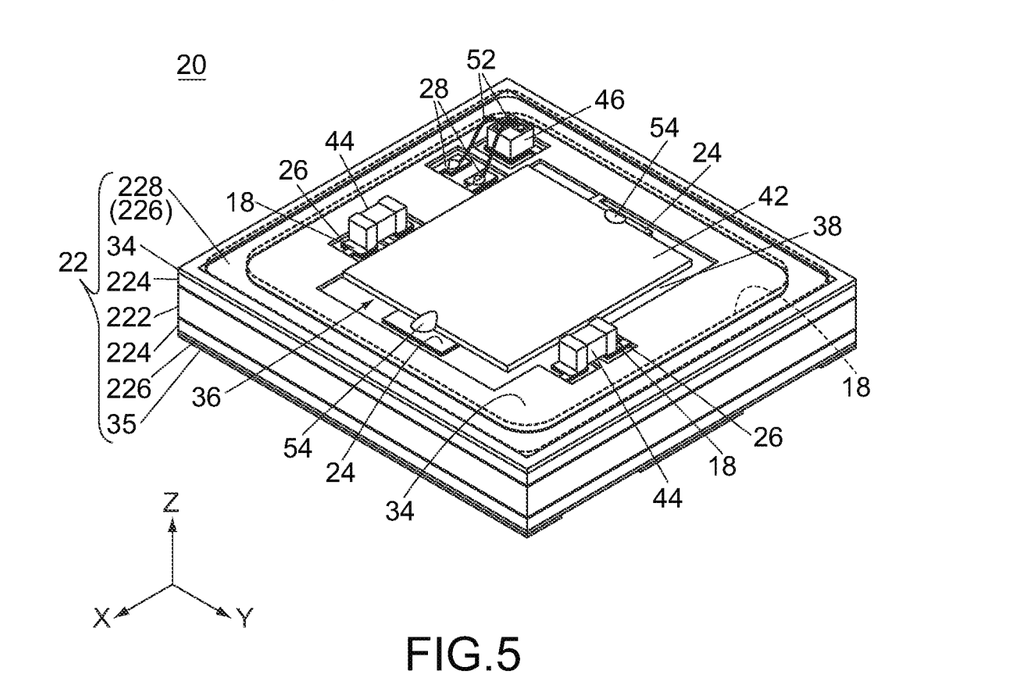
FIG. 5 is a perspective showing a main member of the pyroelectric infrared sensor of FIG. 4, wherein a high melting point solder paste provided on a ground pattern is illustrated with dashed line.

Referring to FIG. 5, the internal board 22 of the present embodiment is a multi-layer circuit board. More specifically, the internal board 22 of the present embodiment comprises one layer of a base member 222 made of glass epoxy resin, two layers of prepregs 224, two layers of circuit patterns 226 each made of conductor and two layers of resists 34 and 35 each made of insulator. A part of the upper circuit pattern 226 is located at the periphery of the upper circuit pattern 226 in the horizontal plane, and this part works as a ground pattern 228. The resists 34 and 35 include an upper resist 34 and a lower resist 35.

The base member 222 and the two layers of the circuit patterns 226 are vertically stacked via the prepregs 224. The two layers of the circuit patterns 226 are connected to each other via through holes. As a result, the internal board 22 is formed with an electronic circuit (hereafter, referred to as "infrared detection circuit") which detects infrared light and outputs the detection result. The internal board 22 of the present embodiment has the aforementioned structure. However, the structure of the internal board 22 of the present invention is not specifically limited, provided that the internal board 22 comprises the infrared detection circuit.

Figure 6:
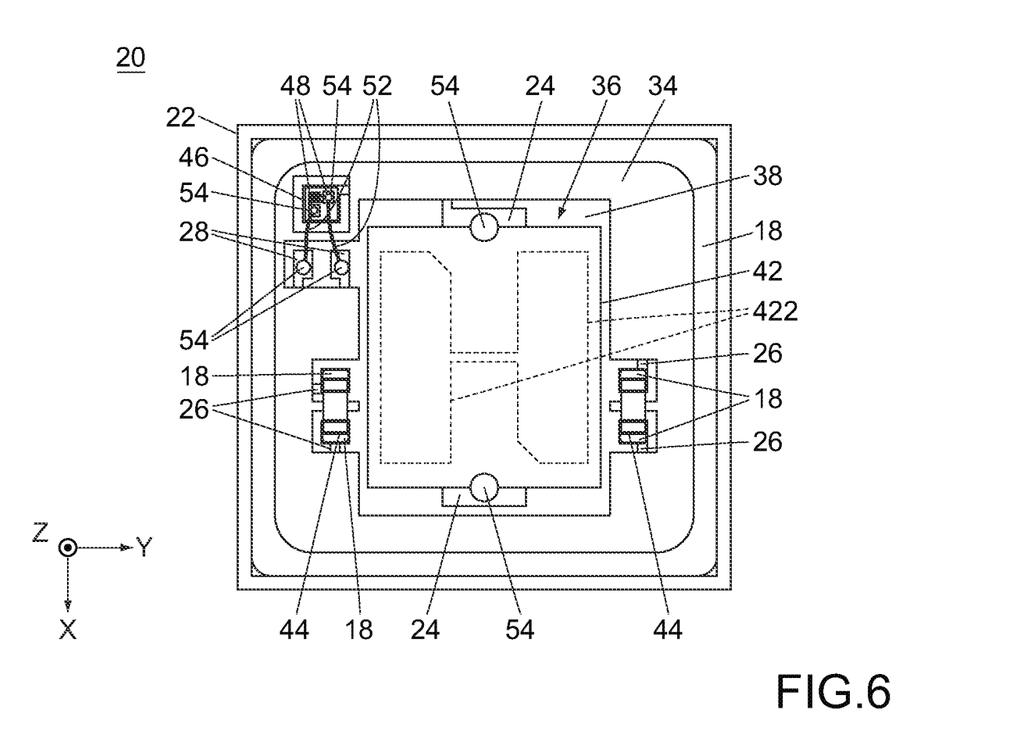
FIG. 6 is a plan view showing the main member of FIG. 5, wherein a positions of upper electrodes of a pyroelectric element are illustrated with dashed line.

Referring to FIGS. 5 and 6, the internal board 22 is provided with two first electrode pads 24 each made of conductor, four second electrode pads 26 each made of conductor, two third electrode pads 28 each made of conductor and the resist 34. The first electrode pads 24, the second electrode pads 26 and the third electrode pads 28 are connected to the infrared detection circuit (not shown). The first electrode pads 24, the second electrode pads 26, the third electrode pads 28 and the resist 34 are located on an upper surface of the internal board 22. Thus, the first electrode pads 24, the second electrode pads 26, the third electrode pads 28 and the resist 34 are located in a common predetermined plane. The predetermined plane of the present embodiment is a plane in parallel to the horizontal plane.

The resist 34 is formed with a single predetermined opening 36. The predetermined opening 36 is an area where the resist 34 is not provided. In other words, the predetermined opening 36 is a recess having a bottom surface 38. The bottom surface 38 is a part of the upper surface of the internal board 22. The predetermined opening 36 is located at the middle of the upper surface of the internal board 22 in the horizontal plane. The predetermined opening 36 is enclosed by the resist 34 in the horizontal plane and is slightly recessed downward from the resist 34. The first electrode pads 24, the second electrode pads 26 and the third electrode pads 28 are located in the predetermined opening 36. In other words, the resist 34 encloses the first electrode pads 24, the second electrode pads 26 and the third electrode pads 28 in the horizontal plane.

The upper surface of the internal board 22 of the present embodiment has the aforementioned structure. However, the present invention is not limited thereto, but the structure of the upper surface of the internal board 22 can be modified as necessary. For example, the number and the arrangement of electrode pads including the first electrode pads 24, the second electrode pads 26 and the third electrode pads 28 can be modified in accordance with the components mounted on the internal board 22. The resist 34 may be formed with two or more of openings which correspond to the first electrode pads 24, the second electrode pads 26 and the third electrode pads 28, respectively.

Figure 3:
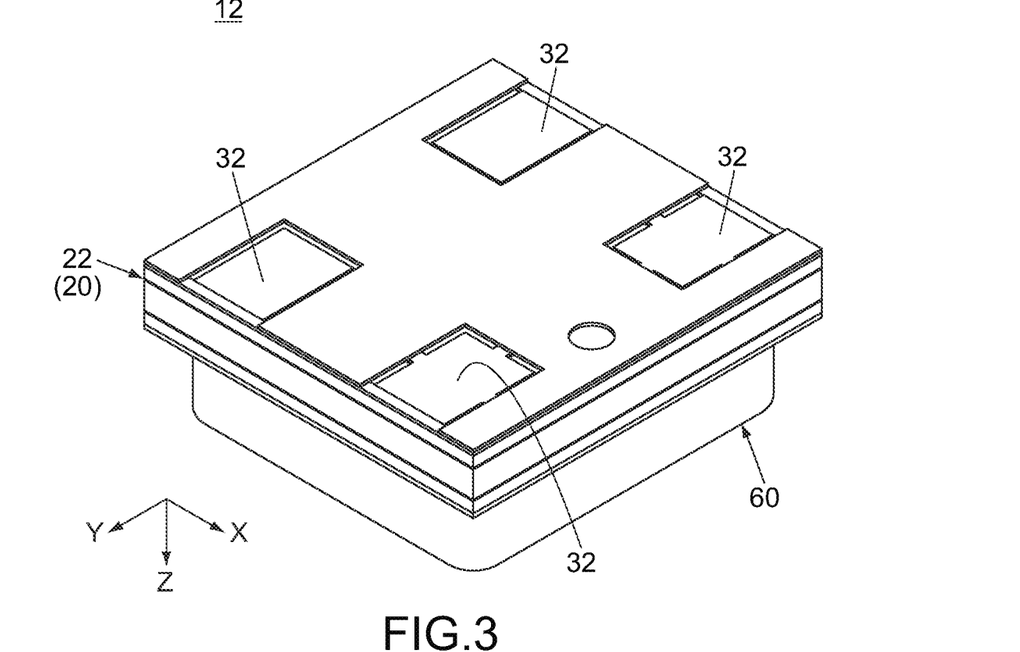
FIG. 3 is another perspective view showing the pyroelectric infrared sensor of FIG. 2.

Referring to FIG. 3, the internal board 22 of the present embodiment has a lower surface, or a bottom surface, which is provided with four connection terminals 32 each made of conductor. The connection terminals 32 are connected to the infrared detection circuit (not shown). The detection result of the infrared detection circuit is output to the external board 14 (see FIG. 1) through the connection terminals 32. According to the present embodiment, two of the four connection terminals 32 are located at one of opposite sides of the internal board 22 in the second horizontal direction (Y-direction), and remaining two of the four connection terminals 32 are located at a remaining one of the opposite sides of the internal board 22 in the second horizontal direction. However, the number and the arrangement of the connection terminals 32 of the present invention are not specifically limited.

Referring to FIGS. 5 and 6, the pyroelectric element 42 of the present embodiment has a composition of PbCa(MnSb)TiO. More specifically, the pyroelectric element 42 can be made of pyroelectric material represented by composition formula of $(Pb_{(1-x)}Ca_x)(1-a)(Ti_{(1-y)}(Mn_{1/3}Sb_{2/3})_y)O_3$ wherein $0.12 \leq x \leq 0.23$, $0.040 \leq y \leq 0.100$, $-0.020 \leq a \leq 0.020$). According to this composition, the pyroelectric element 42 has a Curie temperature equal to or higher than 295° C. and can keep desired capability even when exposed to a high temperature of 250° C. or more.

The pyroelectric element 42 has a thin rectangular flat-plate shape in parallel to the horizontal plane. An upper surface of the pyroelectric element 42 is formed with two rectangular upper electrodes 422 (see FIG. 6), and a lower surface of the pyroelectric element 42 is formed with two rectangular lower electrodes (not shown) which correspond to the two upper electrodes 422, respectively. The two upper electrodes 422 are coupled together in the second horizontal direction (Y-direction) and are covered by infrared absorption films (not shown). According to the structure described above, when infrared light radiated on the upper surface of the pyroelectric element 42 is changed, a voltage difference is generated between the two lower electrodes. Thus, the pyroelectric element 42 has infrared detection capability.

The pyroelectric element 42 of the present embodiment has the aforementioned structure. However, the structure of the pyroelectric element 42 is not specifically limited, provided that the pyroelectric element 42 has required infrared detection capability and required heat tolerance.

Referring to FIG. 4, the pyroelectric element 42 is connected to the first electrode pads 24. The thus-connected pyroelectric element 42 is located just under the optical filter 66 and can reliably receive infrared light. In detail, the two lower electrodes (not shown) of the pyroelectric element 42 are connected to the two first electrode pads 24 with conductive adhesives 54, respectively. As a result, the voltage difference generated between the lower electrodes is output to the infrared detection circuit (not shown).

Referring to FIGS. 5 and 6, each of the capacitor elements 44 of the present embodiment is connected to the second electrode pads 26. In detail, two terminals (not shown) of each of the capacitor elements 44 are connected to the two second electrode pads 26, respectively. The capacitor elements 44 are used to reduce problems which might be caused due to high frequency noise. By connecting the capacitor elements 44 to the infrared detection circuit (not shown), infrared detection capability of the pyroelectric infrared sensor 12 can be improved as a whole under a wireless communication environment of high frequency band.

The JFET 46 of the present embodiment is connected to the third electrode pads 28. In detail, the JFET 46 has two electrodes 48. The two electrodes 48 are provided so that they correspond to a drain and a source of the JFET 46, respectively. Each of the electrodes 48 is connected to one of the third electrode pads 28 by a wire 52 made of metal. For each of the wires 52, one of opposite ends is connected to the electrode 48 with the conductive adhesive 54, and a remaining one of the opposite ends is connected to the third electrode pad 28 with the conductive adhesive 54.

According to the present embodiment, the resist 34 is provided between the JFET 46 and the third electrode pads 28, and the peripheral edge of the JFET 46 is enclosed by the resist 34. The resist 34 is provided as described above, and thereby an uneven structure is formed around the JFET 46. As a result, a creepage distance of a path through which moisture might spread to the JFET 46 can be made long, and possibility of insulation resistance degradation and other problems can be further reduced.

As described above, the electrodes 48 of the JFET 46 are wire-bonded to the third electrode pads 28, respectively. By connecting the JFET 46 to the infrared detection circuit (not shown) not by a solder but by the wires 52 and the conductive adhesives 54, the voltage output from the pyroelectric element 42 can be amplified while manufacturing cost is reduced. In addition, degradation in quality due to solder flash can be prevented.

The JFET 46 of the present embodiment is a bare chip and is not sealed in a package made of material such as resin. The bare chip is suitable to wire-bonding. However, the present invention is not limited thereto. For example, the JFET 46 may be sealed in a package. Moreover, another switching element such as a metal oxide semiconductor field effect transistor (MOSFET) may be used instead of the JFET 46.

Hereafter, explanation will be made about the pyroelectric infrared sensor 12 which comprises the aforementioned members.

Referring to FIG. 1, the pyroelectric infrared sensor 12 of the present embodiment is surface-mounted on the external board 14 of the electronic device 10 via soldering. In general, when a component such as the pyroelectric infrared sensor 12 is surface-mounted on an object such as the external board 14, first, a solder paste is printed on electrodes of the object. Then terminals of the component are placed on the solder paste. Then, the object and the component are placed in a reflow oven and are heated to a temperature equal to or more than a liquidus temperature of the solder paste, or a temperature at which the solder paste is melted into a liquid phase. Then, the object and the component are taken out of the reflow oven and are cooled. As a result, the terminals of the component are fixed and electrically connected to the electrodes of the object via the solder.

The aforementioned reflow, i.e., soldering using a reflow oven, is also performed when the pyroelectric infrared sensor 12 itself is manufactured.

More specifically, referring to FIG. 4 together with FIG. 1, the pyroelectric infrared sensor 12 of the present embodiment is manufactured as described below and is then incorporated in the electronic device 10. First, the internal board 22 is made. Then, the internal board 22 in which the capacitor elements 44 are arranged is heated in a reflow oven. Then, the pyroelectric element 42 and the JFET 46 are adhered to the thus-reflowed internal board 22 with the conductive adhesive 54. Then, the shield case 60 is soldered to the internal board 22 in a reflow process. In other words, the whole pyroelectric infrared sensor 12 is heated in a reflow oven. The pyroelectric infrared sensor 12 which is manufactured as described above is connected to the external board 14 in another reflow process. As can be seen from the explanation described above, at least three times of reflows are performed upon manufacturing the electronic device 10 of the present embodiment.

In general, when a solder paste has a low liquidus temperature, terminals of a component are easily positioned to electrodes of an object with no external force during a reflow process. In other words, a component can be easily self-aligned by using a solder paste which has a low liquidus temperature. Accordingly, a low melting point solder paste 16 which has a liquidus temperature equal to or less than 220° C. is preferred as a solder paste. The low melting point solder paste 16 is also used in the electronic device 10 of the present embodiment in order for the pyroelectric infrared sensor 12 and the other components (not shown) to be soldered to the external board 14. The low melting point solder paste 16 is also used in an existing pyroelectric infrared sensor in order for its internal components to be soldered.

An existing pyroelectric infrared sensor is mounted on an external board together with other components (not shown) similarly to the pyroelectric infrared sensor 12 of the present embodiment. The thus-mounted existing pyroelectric infrared sensor is reflowed and forms an existing electronic device. There is concern that the thus-manufactured existing electronic device might have problems even though the reflow is performed under an expected temperature of 220° C. The problems might be caused as described below.

In general, the temperature during a reflow process in manufacture of an electronic device is set to be about 220° C. which matches the low melting point solder paste 16. However, the thus-manufactured electronic device sometimes comprises an external board on which not only an electronic component having a size similar to that of a pyroelectric infrared sensor but also another electronic component having a size rather larger than the pyroelectric infrared sensor is mounted. Regarding such an electronic device, even when the preset temperature during a reflow process is about 220° C., the heating time is sometimes made longer than expected so that the large electronic component can be reliably soldered on the external board. As a result of this long time heating, the peak temperature in a reflow oven might reach up to near 250° C. As described above, the peak temperature in a reflow process sometimes exceeds the expected temperature.

The pyroelectric element 42 of the present embodiment has a Curie temperature higher than the peak temperature about 250° C. Therefore, when an existing pyroelectric infrared sensor comprises the pyroelectric element 42, the pyroelectric element 42 itself does not cause any problems. However, the existing pyroelectric infrared sensor includes components other than the pyroelectric element 42 which might cause problems. More specifically, as previously described, the low melting point solder paste 16 is used for soldering internal components provided in an existing pyroelectric infrared sensor. When the peak temperature exceeds the expected temperature during a reflow process in which an existing pyroelectric infrared sensor is connected to an external board, the low melting point solder paste 16 in the existing pyroelectric infrared sensor might be remelted, and the thus-remelted solder past might cause electrical malfunction.

The pyroelectric infrared sensor 12 of the present embodiment is configured to be connected to the external board 14 with the low melting point solder paste 16 similarly to the existing pyroelectric infrared sensor. However, referring to FIGS. 5 and 6 together with FIG. 1, a high melting point solder paste 18 instead of the low melting point solder paste 16 is used for soldering the internal components provided in the pyroelectric infrared sensor 12 of the present embodiment. For example, each of the capacitor elements 44 is connected to the second electrode pads 26 with the high melting point solder paste 18 which has a liquidus temperature equal to or more than 240° C. In other words, each of the capacitor elements 44 is connected to the second electrode pads 26 with the high melting point solder paste 18 which has a melting point higher than that of the low melting point solder paste 16. The pyroelectric infrared sensor 12 is connected to the external board 14 with the low melting point solder paste 16 which has a melting point lower than that of the high melting point solder paste 18.

According to the present embodiment described above, the high melting point solder paste 18 is not substantially remelted even when the peak temperature is made high during the reflow process in the manufacture of the electronic device 10. According to the present embodiment, problems which might be caused due to the remelted low melting point solder paste 16 can be reduced. The pyroelectric infrared sensor 12 of the present embodiment includes no components which are largely affected by heat about 250° C. In addition, the conductive adhesive 54 of the present embodiment has a thermal decomposition temperature about 300° C., and thereby the conductive adhesive 54 is not affected by the heat about 250° C. Accordingly, there are no substantial problems even when the peak temperature is made high during the reflow process in the manufacture of the pyroelectric infrared sensor 12.

Referring to FIG. 4, the shield case 60 of the present embodiment is fixed on and connected to the internal board 22 with the high melting point solder paste 18. Therefore, the shield case 60 remains firmly fixed to the internal board 22 even when the peak temperature is made high during the reflow process in the manufacture of the electronic device 10. According to the present embodiment, the positional relation between the optical filter 66 and the pyroelectric element 42 can be reliably kept. In addition, affection of high frequency noise can be reduced by connecting the shield case 60 to the ground pattern 228 of the internal board 22 via the high melting point solder paste 18.

The shield case 60 may be fixed to the internal board 22 with the conductive adhesive 54 (see FIG. 5). However, the conductive adhesive 54 is usually porous and easily absorbs moisture in the air. When the conductive adhesive 54 absorbs moisture, fixing strength between the shield case 60 and the internal board 22 might be lowered. The high melting point solder paste 18 is preferable in order for the electronic device 10 to be used in a relatively humid environment.

Referring to FIGS. 5 and 6, the high melting point solder paste 18 of the present embodiment is made of Sn—Sb alloy and has a low self-alignment capability. However, even when the capacitor elements 44 are displaced in the horizontal plane to some extent, capability of the pyroelectric infrared sensor 12 is not affected. Therefore, the capacitor elements 44 can be soldered with the high melting point solder paste 18.

According to the present embodiment, the capacitor elements 44 are soldered with the high melting point solder paste 18 during the reflow process in the manufacture of the main member 20. The shield case 60 is soldered with the high melting point solder paste 18 in the reflow process in the manufacture of the pyroelectric infrared sensor 12 in which the manufactured main member 20 is used. The high melting point solder paste 18 of the capacitor elements 44 is remelted during the latter reflow process. However, no resin member is provided around the capacitor elements 44. Accordingly, even when the high melting point solder paste 18 is remelted, the capacitor elements 44 merely float up and down, and solder flash will not be caused.

The pyroelectric element 42 needs to be relatively accurately positioned. Therefore, the pyroelectric element 42 is unsuitable to the connection which uses the high melting point solder paste 18 even though the pyroelectric element 42 has a high heat resistance. Accordingly, the pyroelectric element 42 is not connected to the first electrode pads 24 with a solder paste but is connected to the first electrode pads 24 with the conductive adhesive 54.

Similarly, the JFET 46 needs to be relatively accurately positioned. Therefore, the JFET 46 is not directly fixed to the third electrode pads 28 with a solder paste but is connected to the third electrode pads 28 with the wires 52 and the conductive adhesive 54 under a state where the JFET 46 is fixed to a predetermined position with the conductive adhesive 54. However, the present invention is not limited thereto. For example, if some high melting point solder paste (not shown) could be used, the JFET 46 may be connected to the third electrode pads 28 with this high melting point solder paste.

Referring to FIG. 5, the layers of the internal board 22 of the present embodiment are vertically fixed on each other via the prepregs 224. For example, if the layers of the internal board 22 were fixed on each other via bonding sheets, the bonding sheets might be removed at the melting point of the high melting point solder paste 18. According to the present embodiment, the internal board 22 can be improved in heat resistance.

Figure 7:
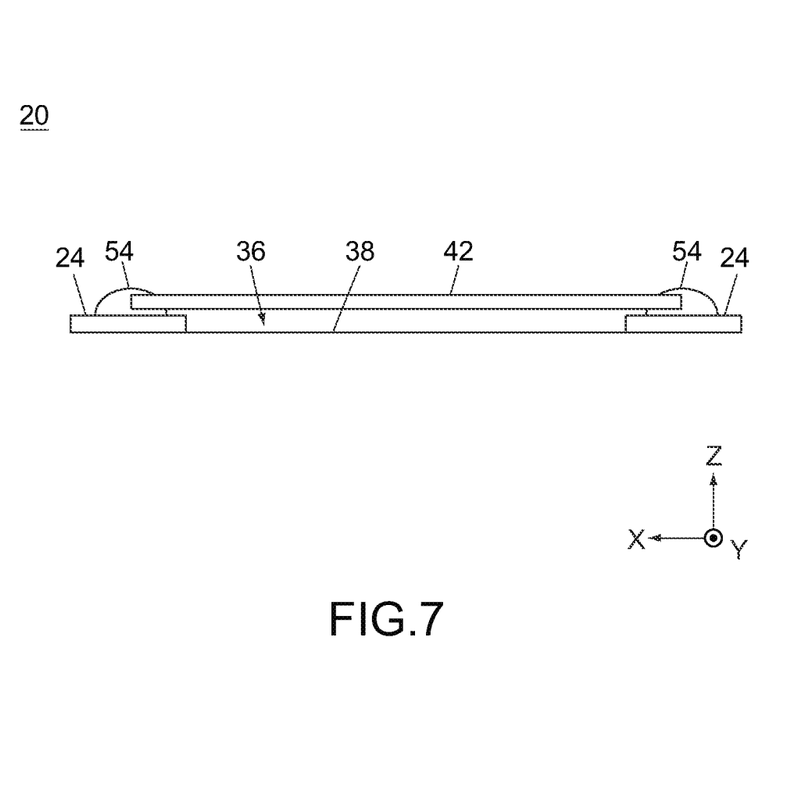
FIG. 7 is a side view schematically showing a part of the main member of FIG. 6.

As shown in FIG. 6, a size of the predetermined opening 36 along the predetermined plane (XY-plane) is larger than another size of the pyroelectric element 42 along the predetermined plane. More specifically, when the pyroelectric element 42 fixed to the first electrode pads 24 is seen from above, the whole pyroelectric element 42 is located in the predetermined opening 36. Referring to FIG. 7, the pyroelectric element 42 is supported by the conductive adhesives 54 so that the pyroelectric element 42 is located above the predetermined opening 36. In other words, the conductive adhesive 54 works not only as a conductive member but also as a support member. The pyroelectric element 42 is apart from the bottom surface 38 of the internal board 22 except for a part of the lower electrodes (not shown), and thereby infrared detection capability of the pyroelectric element 42 is prevented from being degraded.

The pyroelectric element 42 of the present embodiment is apart from the bottom surface 38 of the internal board 22 by a thickness of the resist 34 which is specifically about 0.08 mm. According to the present embodiment, the pyroelectric element 42 can be located above the bottom surface 38 only by removing the resist 34 of the internal board 22. According to the present embodiment, the internal board 22 can be made of the typical base member 222 (see FIG. 5), and thereby manufacturing coat can be reduced. However, the present invention is not limited thereto. For example, the internal board 22 may be formed with a deep recess.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A pyroelectric infrared sensor comprising an internal board, a pyroelectric element, and a capacitor element, wherein:
   the internal board is provided with two first electrode pads and a second electrode pad;
   the pyroelectric element has a composition of PbCa(MnSb)TiO and is connected to the first electrode pads;
   the first electrode pads and the second electrode pad are apart from each other on an upper surface of the internal board; and
   the capacitor element is connected to the second electrode pad with a high melting point solder paste which has a liquidus temperature of at least 240° C.

2. The pyroelectric infrared sensor as recited in claim 1, wherein:
   the pyroelectric infrared sensor comprises a shield case made of metal and an optical filter;

an opening is formed in the shield case;
the optical filter is attached to the opening; and
the shield case is connected to the internal board with the high melting point solder paste.

3. The pyroelectric infrared sensor as recited in claim 1, wherein:
the pyroelectric infrared sensor comprises a junction field effect transistor (JFET);
the JFET has an electrode;
the internal board is provided with a third electrode pad; and
the electrode of the JFET is wire-bonded to the third electrode pad.

4. The pyroelectric infrared sensor as recited in claim 3, wherein the JFET is a bare chip.

5. The pyroelectric infrared sensor as recited in claim 1, wherein:
the first electrode pads and the second electrode pad are located in a common predetermined plane;
the internal board is provided with a resist;
a predetermined opening is formed in the resist;
a size of the predetermined opening along the predetermined plane is larger than a size of the pyroelectric element along the predetermined plane;
the first electrode pads are located in the predetermined opening;
the pyroelectric element is connected to the first electrode pads with respective conductive adhesives; and
the pyroelectric element is supported by the conductive adhesive so that the pyroelectric element is located above the predetermined opening.

6. An electronic device comprising the pyroelectric infrared sensor as recited in claim 1 and an external board, wherein the pyroelectric infrared sensor is connected to the external board with a low melting point solder paste which has a melting point lower than a melting point of the high melting point solder paste.

7. A pyroelectric infrared sensor configured to be connected to an external board with a low melting point solder paste, wherein:
the pyroelectric infrared sensor comprises an internal board, a pyroelectric element, and a capacitor element;
the internal board is provided with two first electrode pads and a second electrode pad;
the pyroelectric element has a composition of PbCa (MnSb)TiO and is connected to the first electrode pads;
the first electrode pads and the second electrode pad are apart from each other on an upper surface of the internal board; and
the capacitor element is connected to the second electrode pad with a high melting point solder paste which has a melting point higher than a melting point of the low melting point solder paste.

8. An electronic device comprising the pyroelectric infrared sensor as recited in claim 7 and the external board, wherein the pyroelectric infrared sensor is connected to the external board with a low melting point solder paste which has a melting point lower than a melting point of the high melting point solder paste.

9. A pyroelectric infrared sensor comprising an internal board, a pyroelectric element, and a capacitor element, wherein:
the internal board is provided with a first electrode pad and a second electrode pad;
the pyroelectric element has a composition of PbCa (MnSb)TiO and is connected to the first electrode pad;
the capacitor element is connected to the second electrode pad with a high melting point solder paste which has a liquidus temperature of at least 240° C.;
the pyroelectric infrared sensor comprises a junction field effect transistor (JFET);
the JFET has an electrode;
the internal board is provided with a third electrode pad; and
the electrode of the JFET is wire-bonded to the third electrode pad.

10. The pyroelectric infrared sensor as recited in claim 9, wherein the JFET is a bare chip.

11. A pyroelectric infrared sensor configured to be connected to an external board with a low melting point solder paste, wherein:
the pyroelectric infrared sensor comprises an internal board, a pyroelectric element, and a capacitor element;
the internal board is provided with a first electrode pad and a second electrode pad;
the pyroelectric element has a composition of PbCa (MnSb)TiO and is connected to the first electrode pad;
the capacitor element is connected to the second electrode pad with a high melting point solder paste which has a melting point higher than a melting point of the low melting point solder paste;
the pyroelectric infrared sensor comprises a junction field effect transistor (JFET);
the JFET has an electrode;
the internal board is provided with a third electrode pad; and
the electrode of the JFET is wire-bonded to the third electrode pad.

12. The pyroelectric infrared sensor as recited in claim 11, wherein the JFET is a bare chip.

* * * * *